W. C. PERRY.
CLUTCH PULLEY ATTACHMENT.
APPLICATION FILED OCT. 2, 1908.
922,719.
Patented May 25, 1909.
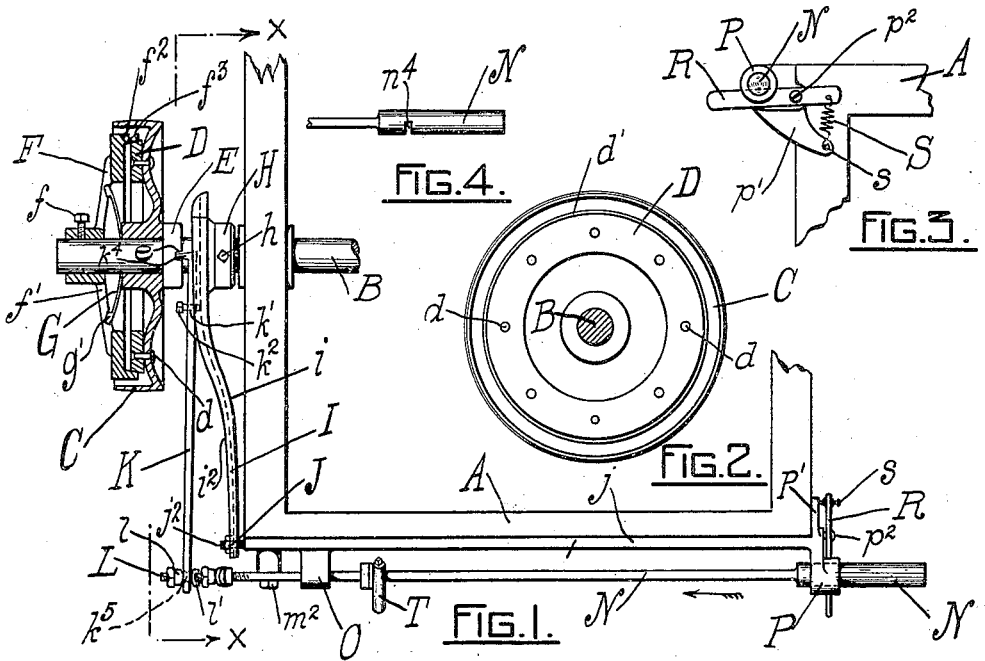
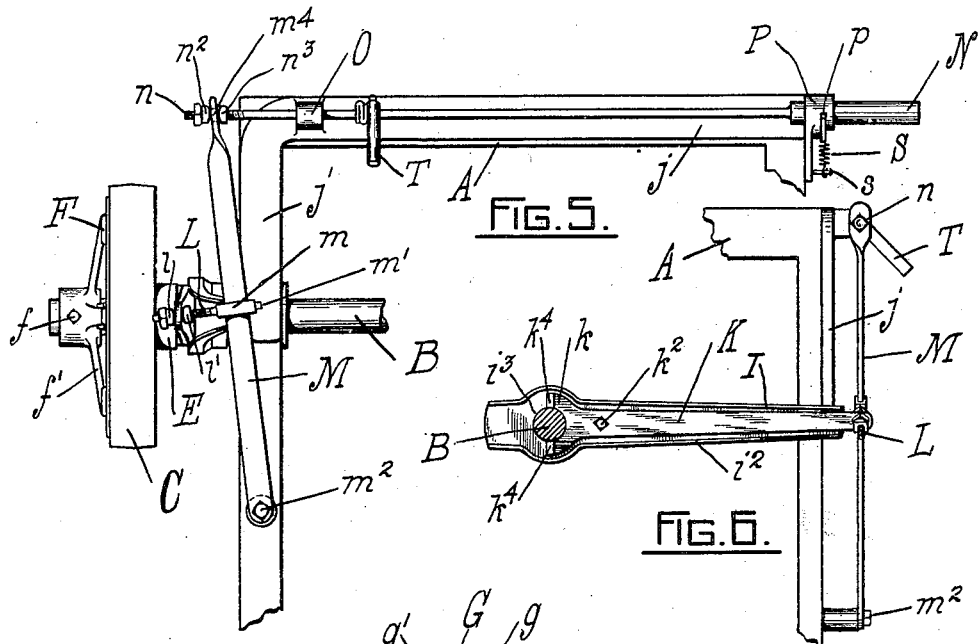
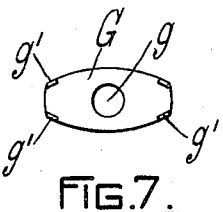
WITNESSES.
Albert G. Pregenthowski
Joseph C. Burns
INVENTOR.
William C. Perry
By Horatio E. Bellows
ATTORNEY.

UNITED STATES PATENT OFFICE.

WILLIAM C. PERRY, OF CHARLESTOWN, RHODE ISLAND.

CLUTCH-PULLEY ATTACHMENT.

No. 922,719.  Specification of Letters Patent.  Patented May 25, 1909.

Application filed October 2, 1908. Serial No. 455,832.

*To all whom it may concern:*

Be it known that I, WILLIAM C. PERRY, a citizen of the United States, residing at Charlestown, in the county of Washington and State of Rhode Island, have invented certain new and useful Improvements in Clutch-Pulley Attachments, of which the following is a specification.

My invention relates to a clutch pulley mechanism adapted to be applied to any power driven machine operated by a pulley.

The essential objects of the invention are to actuate the clamping means by manual operation; to render the clutch mechanism available for facile application to old pulleys; to afford a clamping mechanism which is self contained; to increase the power of the clamping means; and to prevent a shock to the machine frame when the clutch is operated.

To the above ends essentially my invention consists in the novel construction and combination of parts hereinafter described, and illustrated in the accompanying drawings, wherein—

Figure 1 is a plan view of a portion of a machine provided with my novel clutch mechanism showing the pulley and spider in horizontal central section, Fig. 2, a front elevation of the pulley. Figs. 3 and 4, detail views of a portion of the operating rod and the latch mechanism respectively, Fig. 5, a side elevation of a portion of a machine frame, showing my device in like elevation attached thereto, Fig. 6, a section on line $xx$ of Fig. 1, and Fig. 7, a detail view of the clutch spring.

Like reference characters indicate like parts throughout the views.

In the drawings, A represents the frame of any power driven machine; B, the driving shaft; and C, the pulley loosely mounted upon the same provided with the usual rim. Upon the web of the pulley is an annular friction plate, D, secured thereto by bolts, $d$, or otherwise, having an inclined or beveled friction face, $d'$. Adjacent the pulley, C, upon the shaft, B, is a slidable ring, E, whose inner face is provided with diametrically opposite cavities or slots, $e$. A coöperating clutch member, F, is fixed by a screw, $f$, or otherwise to the end of the shaft, B, and comprises radial arms or spokes, $f'$, and a marginal flange, $f^2$, provided with a beveled friction face, $f^3$, adapted to engage the inclined face of the ring, D.

A curved leaf or plate spring, G, is provided with a central opening, $g$, to permit passage therethrough of the shaft, B, and is provided upon each end with two interspaced lugs, $g'$, each pair of which lugs is adapted to embrace opposite spokes of the friction member, F. The convex face of this spring bears against the pulley, C. A collar, H, is fixed by a screw, $h$, to the shaft, B. A long plate, I, provided with an intermediate bend as at $i$, and provided with marginal flanges, $i^2$, and a shaft opening, $i^3$, has its end fixed by a screw and nut connection, J, to a plate, $j'$, fixed to the front of the machine frame by screws, $j^2$, or otherwise. The shaft, B, passes loosely through the opening, $i^3$, and the face of the plate, I, rests against the face of the collar, H.

Intermediate the plate, I, and the collar or ring, E, are the forks, $k$, or bifurcated end of a straight flat lever, K, which is adapted to rest against the face of the plate, I, intermediate the flanges, $i^2$, and is provided near the forks with a threaded opening, $k'$, to receive a screw, $k^2$, whose end bears against the unbent surface of the plate, I, and serves as a fulcrum for the lever, K. The forks or arms, $k$, are curved to permit the shaft to loosely pass therethrough, and are provided at their ends with lugs, $k^4$, adapted to register in the slots, $e$, of the collar, E.

Through an opening, $k^5$, in the end of the lever, K, passes a threaded pin, L, provided with interspaced nuts, $l$, $l'$. The pin, L, is fixed to a collar or strap, $m$, adjustable by a screw, $m'$, upon a lever, M, whose lower end is pivoted by a pin, $m^2$, to the machine frame, and whose upper end is provided with an opening, $m^4$.

A rod, N, is slidably mounted in lugs or bearings, O and P, upon the plate, $j$, fixed to the front of the machine frame. One end of the rod, N, is threaded as at $n$, and loosely passes through the opening, $m^4$ of the lever, M. Nuts, $n^2$ and $n^3$ upon the threaded portion, $n$, of the rod, N, loosely retain the lever, M. Near the opposite end of the rod, N, is an arcuate slot, $n^4$. The bearing, P, is provided with a cavity, $p$, which registers with the slot, $n^4$, and has an integral depending arm, $p'$. Pivoted intermediate its length by a screw, $p^2$, upon the bearing, P, is a latch, R, whose end is connected by a retractile spring, S, to a pin, $s$, in the end of the arm, $p'$. This spring normally forces the latch, R, into the slot, $n^4$.

A handle, T, is fixed to the shaft, N, intermediate the length of the latter.

The operation of my attachment is as follows: The ring, D, and flange, $f^2$, of the friction clutch are thrown out of engagement by the spring, G, which presses the slidable pulley, C, and collar, E, toward the machine frame, and against the forked end lever, K. This forces the opposite end of the lever, K, outwardly because of its fulcrum member, $k^2$. This movement is communicated through the pin, L, and lever, M, to the slidable operating rod, N, which moves in the direction of the arrow, when it is released. The release is effected by manually depressing the latch, R, out of the slot, $n^4$, or by partially turning the rod, N, by the handle, T, which thus rotates the slotted portion of the rod, N, out of engagement.

When the clutch is in released or inoperative position, the handle, T, is manually forced in the direction opposite to the arrow until the catch, R, registers in the slot, $n^4$, and locks the rod in operative position. This movement of the rod forces the clutch mechanism against the pressure of the spring, G, into frictional operative engagement.

It will be noted that the described parts are self contained and are readily utilizable upon old machine pulleys.

What I claim is,

1. In a device of the character described, the combination with a machine frame and a driving shaft, of coöperating friction clutch members upon the driving shaft, a rod slidably mounted upon the machine frame, operative connections between the clutch members and rod, spring means upon the shaft for sliding the rod, means upon the frame and engaging the rod for locking the rod against the action of the spring means, and means upon the rod for releasing the rod from the locking means.

2. In a device of the character described, the combination with a machine frame and driving shaft, of a clutch pulley slidably mounted upon the shaft, a clutch member fixed to the shaft and adapted to coöperate with the pulley, a spring intermediate the pulley and the clutch member, a slidable collar upon the shaft in contact with the pulley and provided with slots, a fulcrum plate upon the shaft, a lever fulcrumed intermediate its length upon the fulcrum plate, lugs upon the lever adapted to register in the slots, a rod slidably mounted upon the frame, operative connections between the lever and rod, and a latch upon the machine frame adapted to engage the rod.

3. In a device of the character described, the combination with a machine frame and driving shaft, of a clutch pulley slidably mounted upon the shaft, a clutch member fixed to shaft adjacent the pulley, spring means contacting with the pulley and clutch member for normally separating the pulley and clutch member, a slidable collar upon the shaft adjacent the pulley provided with slots, a fulcrum plate fixed to the frame, a lever fulcrumed intermediate its length upon the plate, lugs upon the lever extending into the slots, a rod slidably and rotatably mounted upon the frame and provided with a transverse slot, operative connections between the lever and rod, a latch upon the frame adapted to enter the transverse slot, spring means for pressing the latch into the slot, and a handle fixed to the rod and at a right angle thereto.

4. In a device of the character described, the combination with a machine frame and driving shaft, of a clutch pulley slidably mounted upon the shaft, a clutch member fixed to the shaft adjacent the pulley, spring means intermediate the pulley and clutch member adapted to press against the pulley, a collar slidably mounted upon the shaft adjacent the pulley and provided with slots, a fulcrum plate fixed to the frame and provided with marginal flanges, a lever fulcrumed upon the plate intermediate the flanges, lugs upon the lever extending into the slots, a second lever pivotally mounted upon the frame, a pin connecting the levers, a rod slidably mounted upon the frame connected at one end to the second lever, and means upon the frame engaging the rod for locking the rod against longitudinal movement.

5. In a device of the character described, the combination with a machine frame and driving shaft, of a clutch pulley slidably mounted upon the shaft, a clutch ring fixed to the web of the pulley, a clutch member fixed to the shaft adjacent the pulley adapted to engage the clutch ring, a curved plate spring having its ends resting against the clutch member and its convex surface abutting against the pulley, a slidable collar upon the shaft adjacent the pulley, a fulcrum plate mounted upon the frame, a lever fulcrumed upon the plate and contacting at one end with the sleeve, a slidable rod mounted upon the machine frame, operative connections between the rod and the other end of the lever, and means upon the frame engaging the rod for locking the rod against longitudinal movement.

6. In a device of the character described, the combination with a machine frame and driving shaft, of a clutch pulley slidably mounted upon the shaft, a clutch ring provided with a beveled face fixed to the web of the pulley, a clutch member fixed to the shaft, a flange upon the clutch member provided with a beveled face adapted frictionally to engage the beveled face of the clutch ring, a spring intermediate the pulley and clutch member and contacting with both, a slidable collar upon the shaft adjacent the pulley, a fulcrum plate upon the frame, a lever fulcrumed upon the plate and contacting at one end with the sleeve, a slidable rod mounted upon the machine frame, operative connections between the rod and the other end of the lever, and means upon the frame engaging the rod for locking the rod against longitudinal movement.

In testimony whereof I have affixed my signature in presence of two witnesses.

WILLIAM C. PERRY.

Witnesses:
 HORATIO E. BELLOWS,
 WALTER LOUIS FROST.